(12) United States Patent
Brezinski

(10) Patent No.: US 7,165,511 B1
(45) Date of Patent: Jan. 23, 2007

(54) ANIMAL RESTRAINING HARNESS

(76) Inventor: Jessica M. Brezinski, 2018 E. 11 Mile Rd., Royal Oak, MI (US) 48067

( * ) Notice: Subject to any disclaimer, the term of this patent is extended or adjusted under 35 U.S.C. 154(b) by 0 days.

(21) Appl. No.: 10/916,892

(22) Filed: Aug. 12, 2004

Related U.S. Application Data

(60) Provisional application No. 60/494,626, filed on Aug. 12, 2003.

(51) Int. Cl.
*A01K 29/00* (2006.01)

(52) U.S. Cl. ..................................... 119/792

(58) Field of Classification Search ............... 119/792, 119/769, 770, 771, 793, 795, 850, 856, 857, 119/907; 54/71, 24, 85, 64, 18.1, 19.1, 19.3, 54/20, 21
See application file for complete search history.

(56) References Cited

U.S. PATENT DOCUMENTS

| | | | |
|---|---|---|---|
| 1,800,421 A | | 4/1931 | Wickersham et al. |
| 2,605,744 A | * | 8/1952 | Urbanski ..................... 119/863 |
| 2,817,393 A | | 12/1957 | Mitchell |
| 2,826,172 A | | 3/1958 | Buckle et al. |
| 3,310,034 A | | 3/1967 | Hishart |
| D245,350 S | | 8/1977 | Geary |
| 4,060,056 A | | 11/1977 | Maietta |
| 4,106,266 A | | 8/1978 | Hibbert |
| 4,337,610 A | | 7/1982 | Taylor |
| 4,483,275 A | | 11/1984 | DeGroot |
| 4,553,633 A | * | 11/1985 | Armstrong et al. ............ 182/3 |
| 4,565,055 A | | 1/1986 | Simpson |
| 4,566,255 A | | 1/1986 | DeGroot |
| 4,964,369 A | | 10/1990 | Sporn |
| 4,969,419 A | | 11/1990 | Fong |
| 5,146,875 A | | 9/1992 | Bolt |
| 5,154,660 A | | 10/1992 | Snyder et al. |
| 5,247,905 A | * | 9/1993 | Arakawa ..................... 119/863 |
| 5,325,819 A | | 7/1994 | Krauss |
| 5,329,885 A | | 7/1994 | Sporn |
| 5,335,627 A | * | 8/1994 | Bandimere .................. 119/856 |
| 5,383,426 A | * | 1/1995 | Krauss ........................ 119/793 |
| 5,471,953 A | | 12/1995 | Sporn |

(Continued)

FOREIGN PATENT DOCUMENTS

DE  38 37 597  1/1990

(Continued)

OTHER PUBLICATIONS

Mrs. Bones Leashes, web page, Double-Sided Swiss Velvet Leashes/Leads, 2 pages.

(Continued)

*Primary Examiner*—Thomas Price
(74) *Attorney, Agent, or Firm*—Young & Basile, P.C.

(57) ABSTRACT

An animal restraining harness includes first and second straps connected at opposed ends to connectors. A center chest strap extends between the first and second straps. A flexible restraining strap is looped between the connectors and is attachable to a leash. The restraining strap enables the first and second connectors to be pulled together reducing the diameter of the second strap as a result of a pulling movement of an animal wearing the harness which applies pressure on the rib cage of the animal.

15 Claims, 3 Drawing Sheets

U.S. PATENT DOCUMENTS

| | | | |
|---|---|---|---|
| 5,485,810 A | 1/1996 | Sporn | |
| 5,503,113 A | 4/1996 | Knight | |
| 5,511,515 A | 4/1996 | Brown et al. | |
| 5,529,018 A | 6/1996 | Butts | |
| 5,611,298 A | 3/1997 | Sporn | |
| 5,676,093 A * | 10/1997 | Sporn | 119/792 |
| 5,706,764 A | 1/1998 | Irbinskas | |
| 5,713,308 A | 2/1998 | Holt, Jr. | |
| 5,743,216 A | 4/1998 | Holt, Jr. | |
| 5,791,295 A * | 8/1998 | Schmid et al. | 119/793 |
| 5,794,571 A | 8/1998 | Goldberg | |
| 5,893,339 A | 4/1999 | Liu | |
| 5,911,200 A | 6/1999 | Clark | |
| 5,915,335 A * | 6/1999 | Holt, Jr. | 119/771 |
| 5,937,794 A | 8/1999 | Hediger | |
| 5,947,062 A * | 9/1999 | Hoffman et al. | 119/769 |
| 5,967,095 A * | 10/1999 | Greves | 119/795 |
| 5,992,352 A | 11/1999 | Borchelt et al. | |
| 6,085,694 A | 7/2000 | Simon | |
| 6,101,979 A | 8/2000 | Wilson et al. | |
| 6,167,844 B1 * | 1/2001 | Cantrell et al. | 119/856 |
| 6,213,057 B1 * | 4/2001 | Franco et al. | 119/793 |
| 6,295,795 B1 | 10/2001 | Ehrmann | |
| 6,354,247 B1 | 3/2002 | Andrews | |
| 6,401,666 B1 | 6/2002 | Kircher | |
| 6,427,635 B1 | 8/2002 | Ballard | |
| 6,450,130 B1 * | 9/2002 | Goldberg | 119/792 |
| 6,463,888 B2 | 10/2002 | Clark | |
| 6,564,754 B1 | 5/2003 | Cohen | |
| 6,637,377 B2 * | 10/2003 | Lobanoff et al. | 119/792 |
| 2004/0025804 A1 | 2/2004 | Smith et al. | |

FOREIGN PATENT DOCUMENTS

| | | |
|---|---|---|
| FR | 2 301 273 | 9/1976 |
| FR | 2 502 962 | 10/1982 |
| GB | 2 201 874 | 9/1988 |

OTHER PUBLICATIONS

Pet Edge.com web page, p. 115, Martingale No-Slip Collars.

* cited by examiner

ANIMAL RESTRAINING HARNESS

CROSS REFERENCE TO CO-PENDING APPLICATION

This application claims priority benefit of the filing date of U.S. provisional Patent Application Ser. No. 60/494,626, filed Aug. 12, 2003, now abandoned, the entire contents of which are incorporated herein by reference.

BACKGROUND

The present invention relates to a restraining harnesses for animals. Harnesses have been used as a functional device for animals since the time that animals have been domesticated and integrated into the human culture. With increased domestication and integration into the family life the desire to utilize humane control devices for pets has also increased. Restraining pets in a manner which minimizes and/or eliminates undesirable behaviors such as tugging and pulling while walking on a leash is especially desirable.

Prior art harnesses that discourage the tugging/pulling behavior include devices, such as choke collars and prong collars, that create a tightening effect when the animal pulls against the leash.

Prior art harnesses with restraining properties include designs that place pressure underneath the front legs of the animal. These devices may be effective in reducing tugging and pulling, however, the pressure placed on the soft tissue between the legs and chest cavity is often painful for the animal. Although some slight discomfort can be expected in controlling devices, these devices exhibit a high amount of pain and in some cases damage to muscle/tissue.

Prior art designs due to the complex, design and attachment schemes make the harness difficult to place and adjust on the animal. The complex nature of these designs make them difficult to quickly place on an animal. Due to the highly active nature of animals, particularly canine puppies and young adults, the complex installation of such devices becomes even more trying.

The prior art also discloses a restraining harness that tightens around the girth of the animal. The complex nature of this design exhibits properties that make the harness complex to manufacture and assemble.

Thus, it would be desirable to improve upon prior art harnesses by providing a harness which discourages tugging/pulling in a manner than is more comfortable for the animal; that is easily placed on, removed, and secured to the animal, and is easily manufactured and assembled.

SUMMARY

The present invention is an animal restraining harness which minimizes undesirable tugging and pulling of an animal in a manner in which creates only a slight discomfort to the animal.

In one aspect, the inventive harness includes a first front chest portion having first and second ends. A second rear chest portion has first and second ends. The first ends of the first front chest portion and the first end of the rear chest portion are connected to a first connector, and the second end of the front chest portion and the second end of the rear chest portion are connected to a second connector.

A connecting chest portion has first and second ends coupled to the first and second front chest portions and rear chest portions, respectively. A restraining means is flexibly coupled to the first and second connectors for pulling the first and second connectors together to reduce the diameter or girth of the first and second rear chest portion about an animal upon a pulling force exerted by the animal on a leash attached to the restraining means by leash attachment means coupled to the restraining means.

The first and second front and rear chest portions are formed of flexible straps. Length adjustment means may be provided in one or both of the first and second straps. At least one or two openable buckles are formed on the second strap for separating the second strap into separable portions for placement and removal of the harness on and from the animal.

The second strap has at least one cushioned exterior surface facing the animal when the second strap is mounted about the girth of the animal.

The animal restraining harness of the present invention effectively minimizes undesirable tugging and pulling of an animal wearing the harness by creating a slight discomfort to the animal rather than pain or potential to damage to internal organs, muscle, or tissue. The harness is easily applied to and removed from an animal.

BRIEF DESCRIPTION OF THE DRAWING

The various features, advantages, and other uses of the present invention will become more apparent by referring to the following detailed description in which.

DETAILED DESCRIPTION

Figure 1:
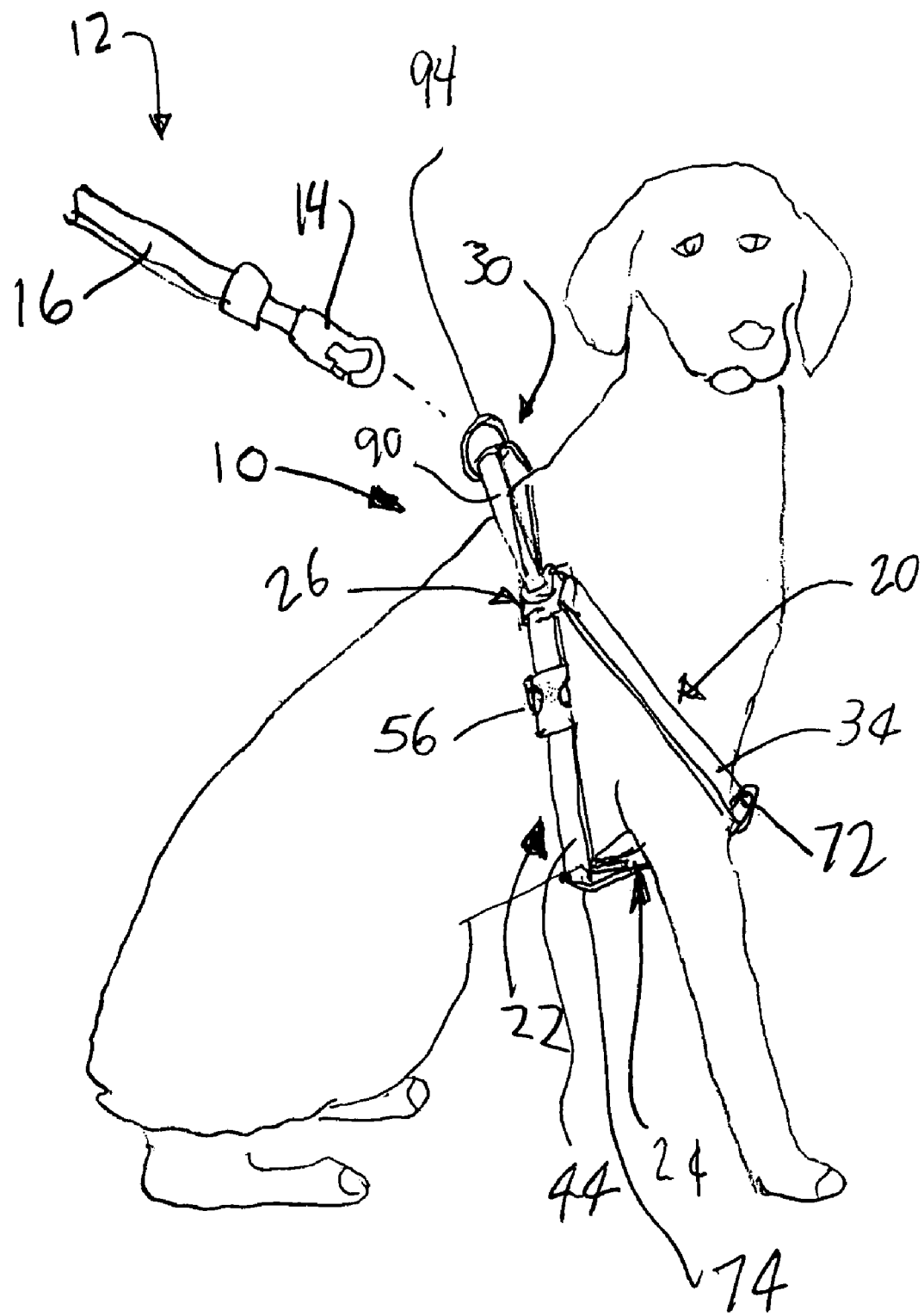
FIG. 1 is a perspective view showing the animal restraining harness of the present invention mounted on an animal.
Figure 2:
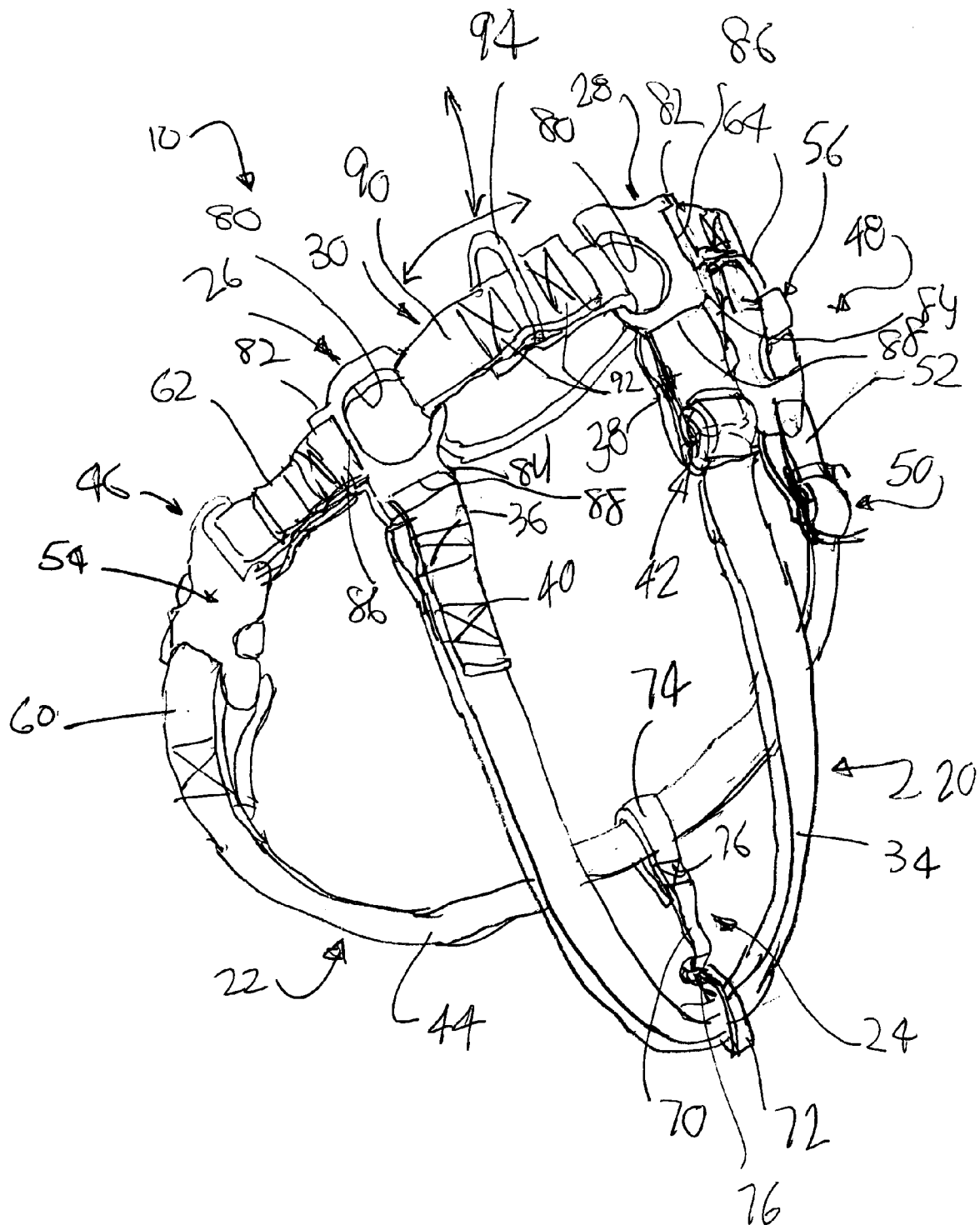
FIG. 2 is a perspective view of the inventive animal restraining harness.

Referring now to FIGS. 1–4, an animal restraining harness 10 constructed in accordance of the teachings of the present invention is depicted. Although the animal restraining harness 10, hereafter referred to simply as the "harness 10", is depicted in FIG. 1 as being mounted over the front body portion of a canine, it will be apparent that the harness 10 can be easily used on all kinds of domesticated and undomesticated animals. Thus, the following description of one use of the inventive harness 10 on a canine or dog would be understood to be by example only.

As shown in FIG. 1, the harness 10 is designed for use in conjunction with a handling device, such a leash 12 having a snap-like connector 14 mounted on one end of a lead 16.

As shown in FIGS. 1–4, the harness 10 includes a first, front chest portion 20, a second, rear chest portion 22, a connecting chest strap portion 24, connector means 26 and 28, and a restraining means 30.

The first front chest 20 is in the form of a first strap 34 having a first end 36 and a second end 38. The first strap 34 is formed of a suitable flexible strap material, such as nylon webbing, although leather or other materials can also be used.

The first and second ends 36 and 38 of the first strap 34 are looped over themselves and joined in an overlapping manner to the strap 34 by stitching 40, heat or sonic welding, etc. This forms a loop at the first and second ends 36 and 38 which can be inserted through and around an opening in the connector means 26 and 28, respectively, as described in greater detail hereafter.

The first strap 34 may also include an optical length adjusting means 42 in the form of a slide three bar having two open loops formed by a spaced center leg and two outer legs. The loop at the second end 38 of the strap 34 is mounted around the center leg of the slide 42. The remaining portion of the second end 38 of the strap 34 is looped through the connector 28, and back through the slide 42 before continuing on to the first end 36.

Alternately, the first strap 34 may be provided in a fixed length for certain sized animals and different lengths for other sized animals, such as small, medium, large, dogs, etc.

The second rear chest portion 22 is also formed of a flexible, second strap 44, made of a suitable material, such as nylon webbing, leather, etc. The strap 44 has a first end portion 46 and a second end portion 48.

The second strap 44 may be provided with an optional length adjustment means 50 in the form of a three bar slide element which receives looped over portions 52 at an end of the second strap 46, in the same manner as the slide 42 and the second end 38 of the first strap 34. The optional length adjustment means allows the length of the second strap 44 to be easily adjusted to accommodate different size dogs.

Alternately, the second strap 44 can be provided in different sizes, in conjunction with different sizes of the first strap 34 to accommodate different size ranges as animals, such as small, medium, and large dogs.

To simplify attachment of the harness 10 on an animal, such as a canine, one or two releasable buckles 54 and 56 are employed. The buckles 54 and 56 may be a conventional tongue and socket type buckle, such as one sold under the trade name Wienerlock by National Moulding. One portion, such as the spring finger, tongue portion of the buckle 54 receives a looped end portion 60 of the second strap 44. The similar spring arm tongue portion of the buckle 56 receives the looped end portion 52 at the other end of the second strap 44.

A short length connector strap 62 has looped ends, joined by stitching, heat welding, etc., between one leg of the connector 26 and a socket portion of the buckle 46. Similarly, another connector strap 64 is looped between the one leg of the second connector 28 and the socket portion of the buckle 56.

The use of two buckles 54 and 56 ensures that the lower chest connector portion strap between the first front chest portion of strap 34 and the connector strap 24 remains centered on the animal. In addition, one or both of the buckles 54 or 56 can be opened to enable the second strap 44 and the first strap 34 to be urged over the head of the animal with the first front chest portion 20, which includes the strap 34, extending in front of the animal's legs. The open buckle 54 or 56 is then snapped together to securely mount the rear chest portion 22, formed of the strap 34, about the chest or girth of the animal, behind the front legs of the animal as shown in FIG. 1.

The connecting chest strap 24 is also formed of a strap 70 constructed of a suitable strap material, such as nylon webbing, leather, etc. The strap 70 has a first end 72 and an opposed second end 74. Although the strap 70 could be securely and immovably fixed to the straps 34 and 44 at the ends 72 and 74, respectively, in one aspect of the present invention, the entire strap 70 is slidably mounted on the straps 34 and 44. This is achieved by forming the first and second end 72 and 74 of the strap 70 with loops in which the free ends of the strap 70 are looped over the strap 70 and fixedly secured to the strap 70 by stitching 76, heat welding, etc.

The connectors 26 and 28 may be any suitable plastic or metal connector having multiple strap connector portions. Thus, the connectors 26 and 28 could be in the form of a circular ring which is capable of receiving the looped end of the various straps 34 and 44 and the restraining means 30, as described hereafter. By way of example only, the connectors 26 and 28 are illustrated as being in the form Halter Square connectors. Such a connector 26 and 28 has a circular portion surrounding a circular aperture 80 and two generally polygonal legs 82 and 84, each of which has a slot-shaped aperture 86 and 88 formed therein. The slots 86 and 88 provide an opening for receiving a portion of the looped ends 36 and 38 of the first chest portion 20, and the connector straps 62 and 64 of the second, rear chest portion 22. A larger circular aperture 80 in each of the connectors 26 and 28 receives a looped end of the restraining means 30.

The restraining means 30 of the present invention is formed of a strap 90 constructed of a suitable material, such as nylon webbing, leather, etc. The strap 90 is formed in a loop wherein opposing ends of the strap 90, after insertion through the apertures 80 in the connectors 26 and 28 are overlapped and fixedly joined together in at least one or more locations by fixing means, such as stitching 92, shown by example in FIG. 2, or by heat welding, etc. The fixing means or stitching 92 forms a transverse bore which receives a leash attachment means or connector 94, such as a D-ring. The ring 94 provides an attachment for the snap connector 14 on one end of a leash 12, as shown in FIG. 1.

Figure 3:
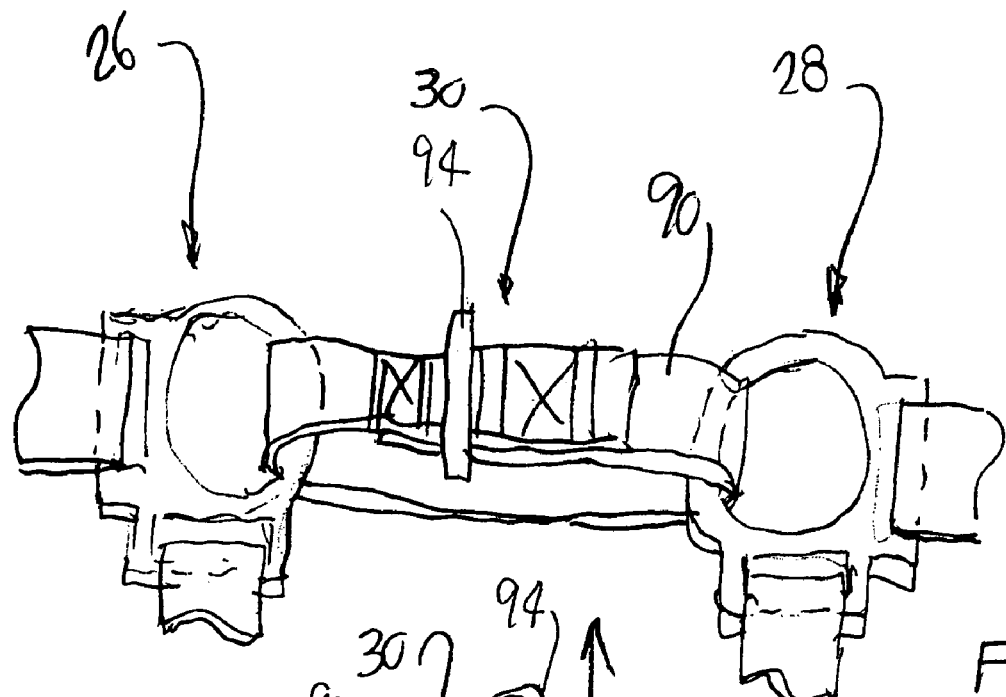
FIG. 3 is a partial, top perspective front view of the restraining means of the inventive harness depicted in a normal, non-force applied position on an animal.
Figure 4:
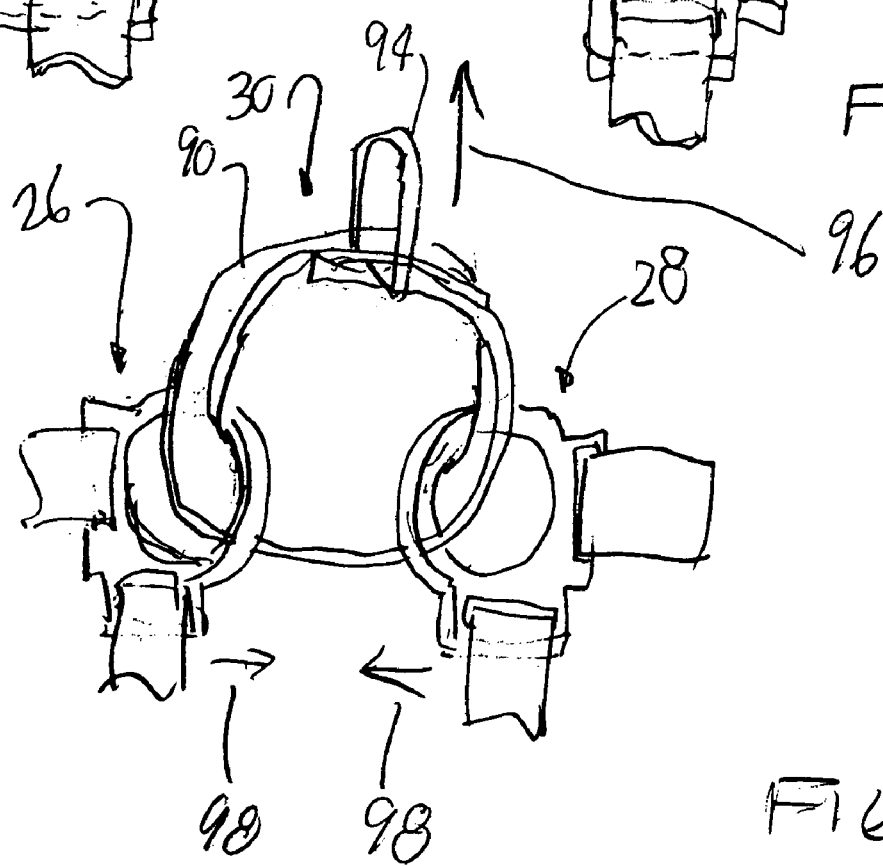
FIG. 4 is a perspective view of the restraining means shown in FIG. 3, but depicted in a girth reducing, restraining force applied position.

Referring now to FIGS. 3 and 4, the restraining means 30 is depicted in the form of the strap 90 looped between the connectors 26 and 28.

In FIG. 3, the restraining means 30 is depicted in a normal mounting position on an animal. The second strap 44 is adjusted in length so as to snugly, but not compressively, fit around the girth or chest of the animal such that the connectors 26 and 28 are spaced apart a suitable distance so that the strap 90 of the restraining means 30 lies in a substantially fully extended, flat position above or on the withers of the animal.

However, when the animal exerts a force against the harness 10 and the attached leash 12 such as by trying to pull away from the person holding the leash 12, a reactive force will be exerted on the restraining means 30 which will cause upper portion of the strap 90 of the restraining means 30 to extend at the connection point to the ring 94 in the direction of the arrow 96 in FIG. 4 away from the animal. Due to the flexible nature of the strap 90, this extension of the upper portion of the strap 90 pulls the connectors 26 and 28 together in the direction of arrows 98 reducing the diameter of the second strap 24 and exerting a compressive force on the rib cage of the animal. This tightening pressure causes the animal to immediately reduce the pulling force on the leash 12. Since the restraining force is applied across the entire chest or rib cage of the animal, the potential for damage to muscles, tissues or organs is minimized.

As soon as the animal reduces the pulling force, the diameter of the second strap 44 will return to its original mounting diameter which will flatten out or return the strap 90 to its maximum loop length as shown in FIG. 3.

In addition to reducing pulling, the harness 10 also minimizes the possibility of escape of the animal from the harness 10. The same tightening of the rear chest portion or strap 44 about the rib cage of the animal behind the front legs of the animal will prevent the animal from retracting its from legs through the rear chest strap 44 to escape from the harness 10.

The inventive harness 10 effectively minimizes undesirable tugging or pulling of an animal in a manner that creates only a slight discomfort rather than pain or potential damage to internal organs, muscle, or tissue. The tightening of the harness applies an even pressure across the rib cage of the animal. The contraction of the rib cage creates a reaction which is less than comfortable to the animal. Thus, the animal stops pulling to relieve the unwanted pressure. Additionally, the harness 10 is easily applied to and removed from an animal.

What is claimed is:

1. An animal harness connectable to a leash comprising:
   a first strap having first and second ends positionable about an animal's abdomen and having a diameter;
   a second strap having first and second ends;
   first and second connectors, the first ends of the first strap and the second strap connected to the first connector, and the second ends of the first strap and the second strap connected to the second connector;
   a continuous connecting strap extendable in a loop and bi-directionally extensibly movably coupled through the first and second connectors, the connecting strap including a first portion disposed between the first and second connectors adjacent to the animal and a second portion extending between the first and second connectors;
   leash attachment means for connecting a leash to the second portion of the connecting strap; and
   wherein upon the application of a pulling force exerted by an animal on the harness, the second portion of the connecting strap increases in length with respect to the first and second connectors and the first portion of the connecting strap decreases in length between the first and second connectors to cause the distance between the first and second connectors to be reduced to thereby reduce the diameter of the first strap about the animal.

2. The animal harness of claim 1 further comprising:
   length adjustment means for adjusting the length of the first strap.

3. The animal harness of claim 1 further comprising:
   length adjustment means for adjusting the length of the second strap.

4. The animal harness of claim 1 further comprising:
   an openable buckle carried on the second strap for separating the second strap into two sections.

5. The animal harness of claim 1 further comprising:
   first and second openable buckles mounted on the second strap.

6. The animal harness of claim 5 further comprising:
   length adjustment means, carried on the second strap, for adjusting the length of the second strap.

7. The animal harness of claim 5 wherein the second strap further comprises:
   a pair of connector straps coupling each of the first and second buckles to the first and second connectors.

8. The animal harness of claim 7 wherein:
   a cushioned surface extends over one surface and at least one side edge of the first strap.

9. The animal harness of claim 1 wherein the first strap further comprising:
   a flexible strap; and
   a cushioned exterior surface disposed on at least one surface of the first strap.

10. The animal harness of claim 1 wherein the first and second straps comprise:
    a flexible strap.

11. The animal harness of claim 1 further comprising:
    a connecting portion having first and second ends coupled to the first strap and the second strap, respectively.

12. The animal harness of claim 11 wherein:
    the first and second ends of the connecting portion are slidably connected to the first and second straps.

13. The animal harness of claim 12 wherein the connecting portion further comprises:
    closed loops formed at the first and second ends of the connecting portion.

14. The animal harness of claim 11 wherein:
    the first strap and the second strap each include flexible first and second straps, respectively;
    the connecting portion is a flexible strap having the first and second ends slidably coupled to the first and second straps;
    length adjustment means carried on the first and second straps for adjusting the length of the first and second straps; and
    an openable buckle carried on the second strap portion for separating one portion of the second strap from the harness.

15. An animal harness comprising:
    first and second connectors, the first and second connectors supporting straps adapted to encircle an animal;
    a restraining strap separate from the straps and coupled between the first and second connectors, the restraining strap including a continuous loop extensibly and retractably bi-directionally, movably arranged relative the first and second connectors with a first portion adjacent to the animal and a second portion;
    an attachment adapted to connect a lead to the restraining strap; and
    wherein upon application of a pulling force exerted by an animal on the harness, the second portion of the restraining strap increases in length with respect to the first and second connectors and the first portion of the restraining strap decreases in length with respect to the first and second connectors to cause the distance between the first and second connectors to be reduced to thereby reduce the length of the restraining strap between the first and second connectors.

* * * * *